United States Patent

[11] 3,615,671

[72] Inventors Myron D. Shoaf
 Battle Creek;
 Charles W. Groesbeck, Marshall, Mich.;
 David G. Cowart, Chicago, Ill.
[21] Appl. No. 722,560
[22] Filed Apr. 19, 1968
[45] Patented Oct. 26, 1971
[73] Assignee General Foods Corporation
 White Plains, N.Y.

[54] DRY FOOD PRODUCTS IN SPUN FILAMENTS AND METHOD OF MAKING SAME
5 Claims, No Drawings

[52] U.S. Cl................................................. 99/78,
 99/83, 99/134 R, 99/138 R, 99/171 B, 107/54 R
[51] Int. Cl....................................................... A23l 1/00
[50] Field of Search........................................... 99/78, 83,
 138, 134, 171, 171 B, 141; 107/8.7, 4.7, 54.6, 54

[56] References Cited
UNITED STATES PATENTS

| 325,711 | 9/1885 | Stuckes | 99/78 |
| 2,900,258 | 8/1959 | Wagner | 99/78 X |
| 3,221,675 | 12/1965 | Forkner | 107/54 |
| 3,366,485 | 1/1968 | Moen et al. | 99/83 |

FOREIGN PATENTS

| 655,333 | 1/1963 | Canada | 99/138.5 |

Primary Examiner—Morris O. Wolk
Assistant Examiner—Stephen B. Davis
Attorney—Le Fever, Quillinan & Hubbard ABSTRACT: A sugar mix containing at least 60 percent sucrose and a humectant is spun under controlled humidity. The spun sugar filaments are then compressed around dry, particulate food pieces such as a cereal or a beverage mix without affecting the solubility of the filaments. The products is packaged within a moistureproof package.

DRY FOOD PRODUCTS IN SPUN FILAMENTS AND METHOD OF MAKING SAME

BACKGROUND OF THE INVENTION

This invention relates to spun sugar filaments commonly thought of as cotton candy and to a method for preparing them. It is also concerned with unique new products consisting of dry food particles encased in spun sugar filaments.

The concept of spinning sugar is an old concept. Furthermore there was early recognition that solids could be added to cotton candy as disclosed by Morrison in his 1903 patent showing the addition of grated fruits which were thrown into the candy as it was being spun. Progress in this field was seen to continue when in 1940 Cooley et al. obtained a patent for adding popcorn to candy floss. In a more recent development Faulkner obtained a patent in 1965, U.S. Pat. No. 3,221,675, which discloses the use of sugar filaments that are treated in order to reduce their solubility. This reduction in solubility is achieved by compressing the spun filaments substantially and/or by adding a coating material and compressing the filaments. In this manner Faulkner obtained a dense sugar filament which could be used as a packing to cover solid materials such as shrimp, the shrimp being easily removed from the packing when desired.

At the present state of development, the use of highly soluble spun sugar filaments in food products which can be distributed through normal retail outlets, is a desirable but unachieved goal.

One problem immediately presented is the extremely low bulk density of the filaments when spun in the form of a "cotton candy," making it impractical to ship any product containing a reasonable weight.

An attempt to overcome the bulk problem has been made by compacting the fibers after they are spun. However, the degree of compaction necessary substantially changes and reduces the solubility of the sugar filaments.

The high degree of solubility of the filaments has led not only to deliberately compressing filaments to a point where the solubility is substantially changed, but also to coating the filaments in order to decrease their solubility.

A further problem encountered when storing spun filaments, is crystallization of the sucrose, the major constituent of the filaments. Crystallization changes the ability of the fibers to withstand shock and the crystallized fibers tend to break up much more readily than the amorphous fibers.

SUMMARY

It has now been discovered that new and unique food products can be prepared utilizing spun sugar filaments. These products can be prepared by completely encasing dry particulate food particles within a casing of the spun sugar filaments without impairing the rapid solubility of the filaments in aqueous media. Thus, it is now possible to prepare products ranging from ready-to-eat breakfast cereals to beverage mixes in the form of preshaped unitized servings of food particles within sugar filaments.

It has also been possible by this invention to prepare sugar filaments which retain their glasslike, clear structure on storage in substantially moistureproof packages by preventing crystallization of the sucrose. The filament structure is stabilized by adding a humectant to the sugar mix, prior to spinning the filaments. The stabilized filaments tend to resist shock and do not break up as readily as crystallized filaments in shipping and handling.

The aforementioned advantages and other advantages of the invention will be readily apparent from the following description in which the preferred embodiments are set forth in detail.

DESCRIPTION OF THE PREFERRED EMBODIMENT

It has been discovered that unique food products can be made utilizing dry ready-to-consume discrete particles of food and spun sugar filaments. The filaments are spun from a mix which contains a major amount of sucrose, at least 60 percent by weight. The spun fibers are formed into a blanket and when cooled the dry particles are then deposited on the blanket of filaments. The dry particles are then covered completely, so that they are not visible to the eye, by either rolling the blanket into a cylindrical form or laying a second blanket of fibers on top of the particles. The rolled blanket is then compressed to form a complete casing around the dry particles contained within. The pressing or compression step is critical as it must be limited to an amount of compression which will not substantially affect the solubility of the spun filaments. In a sense, the compression operation is really a shaping operation more than it is a compression step. The edge of the shaped covering or casing of filaments is then sealed to provide a continuous outer covering of spun sugar filaments around the thus enclosed particles of food. Each shaped piece or unit is individually wrapped in a substantially moistureproof package and is ready for normal distribution to the consumer.

The shaping operation is a key step in the method of producing these new and unique food items. It is possible to form the filaments into any shape desired and thus a wide range of attractive products can be prepared. However, as indicated in the preceding paragraph, it is extremely important to apply a minimum of pressure in shaping the blankets of filaments, as too much pressure will significantly reduce the solubility of the filaments. Rapid solubility of the filaments in an aqueous medium, e.g., water or milk, is an essential aspect of this invention. The types of products to be made by application of this invention cover a wide range of utility, but all rely on the rapid dissolution of the sugar filaments in an aqueous medium. The degree of compression will vary depending upon the shape and consistency of the product being prepared. Generally, the volume will be reduced at least 30 percent in order to obtain a density of fibers which will produce the desired visual effects. The volume of the mass of fibers should not be reduced more than about 70 percent, or the solubility of the mass will be significantly decreased.

After the individual units of particulate matter within the fibers are formed, e.g., by rolling or covering a bottom blanket with a top blanket and the filaments have been slightly compressed to a desired shape, it is necessary to seal the edges of the formed units. This may be accomplished by the use of heat, steam, wetting, compression at edges, etc. A simple method of sealing, for example, is to take the shaped unit while in its mold, with the edges to be sealed exposed, and hold the mold over the gases emitted from a lighted gas jet. The heat, and possibly the moisture contained within the combustion gases, causes the edges to soften and fuse. Any excess around the seal may be trimmed before the edges are sealed. The shaped unit is then removed from the mold and placed into a substantially moisture-free package. These covered units may then be combined in a larger package for shipment through normal consumer channels.

One product which has been prepared utilizing this invention is a beverage mix. It is possible to dip or immerse one unit for shaped and sealed sugar fibers containing a powdered beverage mix into a glass and almost instantly obtain a ready-to-drink beverage. This is possible because the filaments dissolve very rapidly upon contact with the water, releasing the particles of the beverage mix, which are dispersed throughout the water and therefore easily dissolved. When speaking of a beverage mix what is referred to is a dry blend of powders commonly sold in a jar, from which a desired amount can be spooned into a glass or a pitcher of water to prepare a beverage. The difference between the ordinary beverage mix and the product of this invention is that in the ordinary mix the large majority of the dry mix is sugar in granulated or agglomerated form, while the product of this invention would contain a portion of the sugar in the form of spun filaments. The remainder of the ingredients which make up the beverage mix would constitute the dry particulate matter enclosed within the filaments.

Another completely different type of product prepared by utilizing this invention is a ready-to-eat breakfast cereal in the form of cereal particles encased within the filaments of spun sugar. Such a product offers several advantages over the sugar-coated breakfast cereals currently on the market. It can be shaped in novel and attractive forms. The cereal particles are hidden from view until the unit is dipped into a bowl of milk (or milk is poured over the product) and then the sugar filaments rapidly dissolve, disclosing the discrete particles of cereal. The rapid dissolution of the sugar filaments uniformly and completely sweetens the milk and the product, as it is consumed, has a desired uniform sweetness.

Since the individual units are shaped in a mold it is possible to mold them to any desired form. An additional advantage is that a stirrer may be placed between the blankets of filaments, or in the center of a rolled blanket, prior to sealing the unit, such that the end of the stirrer extends beyond the sealed unit and acts as a handle with which to pick up the unit when it is to be immersed into an aqueous medium. Furthermore, the word stirrer is not to be narrowly construed to mean a stick or elongated rod. Rather the so-called stirrer may be in the shape of a straw for use in a beverage product, in this manner, the straw may be used to help dissolve the particles by stirring and can be used for drinking when dissolved; the stirrer can also be shaped as a spoon, with the spoon end contained within the formed unit and the handle of the spoon extended beyond the sealed edge. The stirrer in the form of a spoon is particularly useful in products such as a ready-to-eat breakfast cereal.

While the products thus described can be made using ordinary spun sugar filaments (e.g. sucrose fibers) it would be very desirable to prepare a filament which would have a controlled texture so that the fibers will form the desired shape and tend to stick to each other with a minimum of compression. Also, it would be desirable to prevent crystallization of the sucrose in the fibers on storage, as crystallization makes the filaments brittle and they would tend to break up when the packages are shipped and handled.

It has been found that these desirable goals can be achieved by using a humectant in the sugar mix to be spun and by carefully controlling the relative humidity of the gases surrounding the filaments as they are spun. When forming a mix to be spun into filaments the major constituent of the mix will be sucrose, in order to obtain the desired sweetness in the product upon dissolution in an aqueous medium. The sucrose will comprise at least 60 percent of the mix when using humectants in the mix and preferably the sucrose level will be as much as 80 or 90 percent of the mix.

It has been found that invert sugars such as invert syrup or corn syrup and polyhydric alcohols, e.g. sorbitol, glycerol and pentahydric alcohols, e.g. xylitol are satisfactory humectants. The level of humectant will vary depending upon the particular humectant selected. For example, satisfactory results are obtained with levels of sorbitol or glycerol up to about 10 percent, but a level of about 5 percent is preferred. Xylitol may be used at a level up to about 5 percent and at a preferred level of 3 to 4 percent. Invert sugars have been used at levels as high as 40 percent, but it has been found that about 20 percent is a preferred level. Corn syrup at levels above 20 percent tend to result in shorter fibers, while invert syrup at levels above 20 percent tend to decrease the fiber solubility and at levels below 20 percent the invert syrup is less effective at preventing crystallization of the fibers.

Generally, it has been found that when humectants are used the fibers are easier to mold and form. Probably, it is the tendency of the humectant to absorb moisture from the surrounding gas, as the fibers are spun, that conditions the fibers.

It was also discovered that it is necessary to control the relative humidity of the surrounding gases in the spinning chamber in order to prevent the humectant from absorbing an undesirable amount of moisture. For example, it was found that the relative humidity of the surrounding air should never be allowed to go above 75 percent relative humidity. When using a mix containing humectants, lower relative humidities are desirable. For example, with glycerol at a 10 percent level it was found that a most desirable humidity was about 50 percent. When using a preferred level of invert sugar, 20 percent, the most desired relative humidity is about 55 percent. As a general rule, the relative humidity should be decreased as the amount of humectant is increased in order to prevent the absorption of too much water from the air. The combination of relative humidity of the surrounding gases during filament formation and the addition of humectant, controls the filament stickiness and thus critically affect the ease with which the molded forms may be made.

It was discovered that the addition of the humectant is also a critical control in maintaining the glasslike, structure of the spun filaments and preventing the crystallization of the sucrose. Thus, the use of humectants serves a dual function. The humectant, in combination with a controlled relative humidity, gives a desired texture to the filaments performing and the humectant acts as a deterrent to sucrose crystallization on storage. The optimum relative humidity to be used with a particular humectant will be easily determined by one skilled in the art.

The following examples will further illustrate the method of making the product and the type of products which can be made.

EXAMPLE I

Preparation of a Beverage Product

Sugar floss was prepared in a Whirlwind sugar floss machine, the relative humidity of the air controlled at 65 percent using a feed material consisting of sugar (sucrose) and a Hilton and Davis wet blend dye containing red No. 2 and blue No. 1 the respective proportions of sugar and dye being 1,876 grams and 3.36 grams. The floss was formed into a blanket which was trimmed to a weight of 16.5 grams. A flavored beverage powder having the following formulation: Sucrose, 88.5 parts; citric acid powder, 5.0 parts; CMC, 2.5 parts; fat (hydrogenated cottonseed oil), 0.8 parts; grape flavoring, 1.8 parts; Hilton and Davis wet blend dye, 0.2 parts; and vitamin A and C preparation, 1.2 parts; was then weighed out into a 16.5 gram sample and the weighed portion of powder was placed on the blanket of floss. The floss was then rolled into a cylinder and compressed in a cookie dough roller to approximately 50 percent of its original volume. The cookie dough roller was then exposed to steam and the action of the steam effectively sealed the ends and seams on the rolled blanket. The finished product was wrapped in a moisture-resistant package and was found to be shelf stable. When placed in an 8 ounce glass of water the product dissolved almost instantaneously and the beverage powder was found to dissolve extremely rapidly because of its uniform dispersion throughout the water.

EXAMPLE II

The product of Example I was prepared as previously described. However, prior to rolling the blanket, a wooden tongue depressor was inserted at one end and was sealed into the product in the steaming operation. It was then found that the tongue depressor made an excellent vehicle with which to handle the beverage product and could be used as a stirrer to even further speed up the dispersion of the beverage powder when the product was placed in the water.

EXAMPLE III

A cotton floss suitable for use in products of this invention was prepared in the following manner: 800 parts of sucrose, 200 parts of invert syrup, and 200 parts of water were added to a small steam kettle. The jacket was heated with 135 pounds per square inch steam and the mix was cooked until a temperature between 305° F. and 315° F. was reached. The mix was stirred constantly while it was being cooked. The mix was then quickly poured into a Teflon-lined receiver and allowed to cool to room temperature. The cooled mass was then ground in a Waring blender into a fine powder. This powder was then used as a feed for a Whirlwind sugar floss machine and spun into a floss. The relative humidity of the air within the machine was maintained at 55 percent. The floss was cooled and formed into a blanket. This blanket is then ready for further use.

EXAMPLE IV

A cereal encased in a sugar floss was then prepared in the following manner: Approximately 4 grams of the cotton floss prepared in Example III was placed on a 3-inch diameter sandwich press to form a bottom blanket. 18 grams of a dry ready-to-eat cereal were then weighed out and placed on top of the blanket of floss. A second blanket weighing approximately 4 grams was then placed over the cereal. The sandwich press was then closed reducing the volume of the product to about 55 percent of its original volume. The excess floss was trimmed from the sandwich press and the press was then exposed to the gases emitting from a Bunsen burner. The action of the hot gases and/or moisture contained within the gases caused the edges of the blanket to fuse and seal. The formed and cooled product was wrapped in a moisture proof wrapping and was ready for storage or shipment. Upon use it was found that when the unit of cotton floss and cereal was placed into a bowl of milk the cotton floss dissolved almost instantaneously, suddenly revealing the cereal particles which separated and dispersed as discrete particles with gentle agitation.

The foregoing examples are meant for illustrative purposes only and are not intended in any way to limit the invention. Obviously many modifications and variations of the invention may be made without departing from the spirit and scope thereof, and therefore only such limitations should be imposed as are indicated in the appended claims.

What is claimed is:

1. A method for preparing a dry food product suitable for dispersion in a cold, aqueous medium comprising spinning a blanket of spun sugar filaments with a humectant under conditions wherein the relative humidity of surrounding atmosphere is controlled to less than about 70 percent; said sugar filaments containing at least 60 percent sucrose and said humectant being present in an amount sufficient to absorb water from the surrounding atmosphere while the filaments are being spun; depositing dry, particulate, edible matter onto the blanket; covering the dry, particulate matter with a second blanket of spun sugar filaments containing said humectant, such that the particulate matter is not visible; compressing the blankets of filaments sufficiently to form the mass into a desired shape, but not enough to substantially impair solubility of the filaments; sealing the edge of the blankets of filaments together thus forming a unit wherein the particulate matter is sealed within a casing of rapidly soluble spun sugar filaments; and enclosing each unit in a substantially moisture proof package, said humectant inhibiting crystallization of the spun sugar filaments in said package.

2. The method of claim 1 wherein the humectant is invert sugar, the invert sugar being present at a level of from 15 to 25 percent by weight of the spun sugar filaments.

3. As an article of manufacture, a food product comprising dry, particulate, edible matter and spun sugar filaments; said spun sugar filaments containing at least 60 percent by weight sucrose, and a humectant at a level sufficient to prevent crystallization of spun sugar filaments during storage in a substantially moistureproof package, the fibers being present in the form of a blanket which has been compressed and shaped to completely enclose and conceal the particulate matter, said compression being limited so as not to substantially change the high solubility of the spun sugar fibers to a cold aqueous media; said particulate matter being readily dispersible in the aqueous media upon dissolution of the spun sugar filaments.

4. The product of claim 3 wherein the humectant is invert sugar.

5. The product of claim 4 wherein the invert sugar is present at a level of from 15 to 25 percent by weight of the spun sugar filaments.

* * * * *